W. H. SAUNDERS.
Axle
No. 7,150.
Patented Mar. 5, 1850.
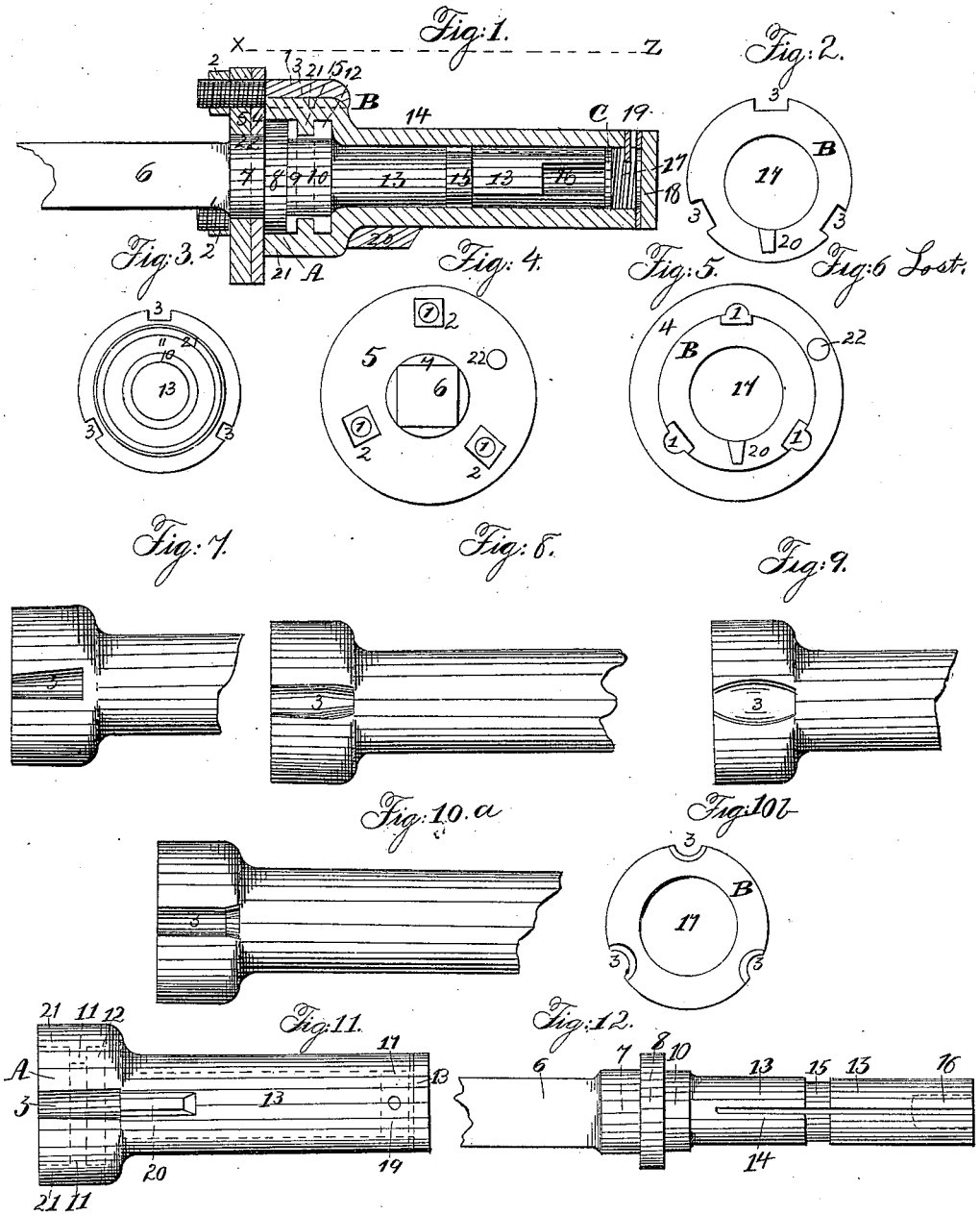
Witnesses
Inventor
W H Saunders

UNITED STATES PATENT OFFICE.

WM. H. SAUNDERS, OF HASTINGS, NEW YORK.

MAIL-AXLE.

Specification of Letters Patent No. 7,150, dated March 5, 1850.

*To all whom it may concern:*

Be it known that I, WILLIAM HENRY SAUNDERS, of Hastings upon Hudson, in the county of Westchester and State of New York, machinist, have invented what is new and an improvement—namely, the making of open grooves of whatever form, cast or cut, in or upon the large end of axle-boxes upon carriage-axles, technically known as "Mail-Axles," and upon axles for cars with short bolts, with whatever form of head, fitted into the grooves for securing the wheels and boxes upon such carriage-axles, and upon cars in the place of and to supersede long bolts which are now in use for securing such wheels and boxes.

I claim as new and an improvement the application of these grooves and short bolts expressly for the axles of carriages and cars, and not to any other article or machine, it being a new application, as to the axles of carriages and cars, I disclaim, hereby, any right to the making of mail axles themselves, and lay claim only to such improvement aforesaid.

To enable others skilled in the art to make and use my said invention and improvement I will proceed to describe its construction and operation.

This improvement with its details is shown in the accompanying drawing from Figure 1 to Fig. 12, inclusive.

In or upon the thickness of the large end of the box, and for the whole length of this enlarged end, or part of it, I cut or cast three or more open grooves, with flat curved or semi-circular beds, the sides of said grooves being dovetailed or otherwise shaped to receive the heads of three or more bolts with nuts for securing the moon-plate and back-washer in their proper places, such bolts not projecting into the hub further than the large end of the box, and thus not touching, and, so, not weakening the spokes. These short bolts being fitted upon the box-end and let in and wedged into the hub at the same time with the box occasion a saving of all the time heretofore required for fitting the long bolts into the hubs. The grooves may be of various forms. But it is intended that they shall be used in connection with the short bolts for the purpose of superseding the long bolts which are now in use for securing the boxes and wheels upon mail axles.

Further and more particular references to the said accompanying drawing and which drawing is to be taken in connection with this specification.

The drawing embraces in Figs. 1 to 12, inclusive, the improved axle-box and bolts and the parts accompanying them now claimed and for which a patent is asked, as follows:

Fig. 1, section of mail axle with improved box upon it showing the relative position of the parts. 1, section of one of the bolts or keys in its place in one of the open grooves made for it in the circumference of the large end of axle box. 2, section of a nut on screwed end of same. 3, section of one of the open grooves cut or cast in the thickness of the large end of box to receive the bolt or key showing by a broken line its depth. 4, leather washer at back of axle collar called back washer, used to make an oil tight joint at the back of box. 5, circular iron plate or disk technically called a moonplate fitting upon the bearing behind the collar of axle 7, and which, by means of the bolts or keys secures the box upon the axle but allows it as well as the moon-plate to turn freely each on its own bearing. 6, square shaft of axle. 7, bearing at back of axle-collar for moon-plate and leather washer. 8, collar of axle. 9, leather washer in front of collar called front washer used to deaden the lateral percussion of the collar of axle against the inner flanch of box. 10, part of the bearing of axle called the bevel, this is made of larger diameter than the rest of the bearing to compensate for the extra strain to which this part of the axle is subjected. 11, inner flanch of axle box against which the front washer 9 bears. 12, oil chamber in box. 13, bearing of axle. 14, groove cut on the top of the axle to allow the oil to flow along the bearing. 15, space turned in the axle bearing for the purpose of distributing the oil passing along the groove (14). 16, oil chamber made in end of axle to contain the principal supply of oil. (This was invented by me several years ago and has ever since been extensively used). 17, metal plug screwed into box secured by pin (19) and made oil tight by leather washer (18,) between the box end and flanch of the plug. 20, lug cast on outside of axle box to prevent its turning in the hub if the wedges should shrink or work loose. 21, bead projecting from thickness of large end of axle box into the back washer to assist in making an oil tight joint. 22, section of hole in moon-plate and washer for guide pin (see Fig. 4). A, space in large end of axle box in front of inner flanch to receive axle collar (8,) and front washer (9,). B, back of large end of axle box where it joins the small end or part inclosing the bearing of axle. C, space in box between end of axle and inside of plug left to allow for the wear of leather washer in front of collar.

Fig. 2, back view of improved box looking from Z to X. 17, metal plug screwed into small end of box. B, large end of box where it joins small end. 3, 3, 3, back of grooves in circumference of large end of box showing their breadth and depth. 20, section of lug.

Fig. 3, front view of axle box, looking from X to Z. 3, 3, 3, front of grooves showing breadth and depth. 13, space in box to receive bearing of axle. 10, ditto to fit bevel of axle. 11, inner flanch of box next (9) front washer. 21, bead on thickness of large end of box.

Fig. 4, back view of axle moon-plate, &c., looking from X to Z. 5, back view of moon-plate. 6, section of axle shaft. 7, section of bearing at back of collar. 1, screwed end of bolts or keys. 2, back view of nuts for same. 22, hole made through moon-plate and back washer to receive a guide pin driven into the hub of the wheel.

Fig. 5, front view of box, &c., looking from Z to X. 1, 1, 1, back end of bolts or keys. 4, leather back washer. 22, hole through ditto for guide pin. B, back of large end of box. 17, plug in small end of box.

Fig. 6, plan and section of bolts or keys. a, side view of bolt of key, with sections of each end. b, plan of same.

Fig. 7, another form of the groove hereby claimed by me and involving my principle. In Fig. 7 the groove does not go through the whole length of the large end of box but is closed at one end.

Fig. 8, another form of the groove going through the whole length of large end of box but with returning angles hereby claimed by me and involving my principle.

Fig. 9, another form of the groove with curved sides hereby claimed by me and involving my principle.

Fig. 10, a, another form of the groove with semicircular bed hereby claimed by me and involving my principle. b, view of the large end of box (looking from Z to X) showing semicircular grooves 3, 3, 3, and 17 small end of box.

Fig. 11, section of improved axle box showing plan of grooves (3) claimed by me. The other numbers refer to parts already described.

Fig. 12, plan of axle out of box. The numbers on the various parts are the same as those in the references to axle under Fig. 1.

What I claim as my invention is—

The making open grooves of whatever form cast or cut in or upon the large end of axle boxes upon carriage axles techincally known as mail axles and upon axles for cars with short bolts with whatever form of head fitted into the grooves for securing the wheels and boxes upon such carriage axles and upon cars in the place of and to supersede long bolts which are now in use for securing such wheels and boxes.

W. H. SAUNDERS.

Witnesses:
 THOS. HINWOOD,
 CHARLES EDWARDS.